(12) United States Patent
Kawai et al.

(10) Patent No.: US 6,529,826 B2
(45) Date of Patent: Mar. 4, 2003

(54) NAVIGATION APPARATUS AND COMMUNICATION BASE STATION, AND NAVIGATION SYSTEM AND NAVIGATION METHOD USING SAME

(75) Inventors: Tomoyuki Kawai, Yamatokoriyama (JP); Kengo Maeda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/995,653

(22) Filed: Nov. 29, 2001

(65) Prior Publication Data

US 2002/0065606 A1 May 30, 2002

(30) Foreign Application Priority Data

Nov. 29, 2000 (JP) .......................... 2000-363910

(51) Int. Cl.$^7$ .......................... G01C 21/00; G08G 1/123
(52) U.S. Cl. .................. 701/211; 701/201; 340/991; 340/995; 342/357.09
(58) Field of Search ................. 701/201, 202, 701/211, 213, 23, 24, 25; 340/988, 990, 995, 991; 342/357.01, 357.06, 357.09, 357.1, 357.13

(56) References Cited

U.S. PATENT DOCUMENTS 6,321,161 B1 * 11/2001 Herbst et al. ................ 701/210

FOREIGN PATENT DOCUMENTS

JP A 9-319991 12/1997

* cited by examiner

Primary Examiner—Yonel Beaulieu
(74) Attorney, Agent, or Firm—Birch, Stewart, Kolasch & Birch, LLP (57) ABSTRACT

A navigation apparatus for guiding a moving body from a current location to a destination using a communication base station includes a current location detection device for detecting a current location of the moving body and outputting current location information; a sending device for sending the current location information and destination information to the communication base station; a receiving device for receiving guiding information, which is required to guide the moving body from the current location to the destination and includes information representing a location of a guiding point and a navigation message corresponding to the guiding point, from the communication base station; a memory device for storing the guiding information; and a voice processing device for outputting the navigation message in voice format, based on the current location information and the information representing the location of the guiding point which is included in the guiding information.

15 Claims, 8 Drawing Sheets

| Guiding point | Latitude | Longitude | Navigation message |
|---|---|---|---|
| A | X1 | Y1 | Turn left at the next intersection |
| B | X2 | Y2 | Turn right at the next intersection |
| C | X3 | Y3 | XX meters to the destination |

| Category | Type | Menu | Name | Address | Distance | Time |
|---|---|---|---|---|---|---|
| Food | Chinese | Menu 1 | Restaurant A | AA | 1km | 5 minutes |
|  |  | Menu 2 | Restaurant B | BB | 3km | 10 minutes |
|  |  | Menu 3 | Restaurant C | CC | 5km | 20 minutes |
|  | Japanese | Menu 1 | Restaurant D | DD | 1km | 5 minutes |
|  |  | Menu 2 | Restaurant E | EE | 3km | 10 minutes |
|  |  | Menu 3 | Restaurant F | FF | 5km | 20 minutes |
|  | Western | Menu 1 | Restaurant G | GG | 1km | 5 minutes |
|  |  | Menu 2 | Restaurant H | HH | 3km | 10 minutes |
|  |  | Menu 3 | Restaurant I | II | 5km | 20 minutes |

NAVIGATION APPARATUS AND COMMUNICATION BASE STATION, AND NAVIGATION SYSTEM AND NAVIGATION METHOD USING SAME

BACKGROUND OF THE INVENTION

1. Field of the Invention

The present invention relates to a navigation apparatus, a communication base station, a navigation system and a navigation method for guiding a moving body, such as, for example, an individual or an automobile to a destination, and in particular to a navigation apparatus, a communication base station, a navigation system and a navigation method using voice for guiding a moving body to a destination.

2. Description of the Related Art

Conventionally, a navigation system is widely used as means for guiding a moving body to a destination. A representative navigation system is a car navigation apparatus mounted on an automobile. An increasing number of car navigation systems include a voice guiding function for safety, in addition to a liquid crystal display for displaying a map to allow the user to visually confirm a route to a destination.

A car navigation apparatus includes a liquid crystal display for the user to visually confirm a route to a destination combined with a recording medium for storing map information (for example, a CD-ROM or DVD). This involves a problem of increasing the cost of such displays and recording media thus preventing use of the car navigation apparatus by a larger population.

As a solution to this problem, voice navigation systems have been proposed. For example, Japanese Laid-Open Publication No. 9-319991 discloses a navigation system which accesses various databases provided in a base station through communication means and notifies the user of the obtained information through a voice synthesis function of a cellular phone, so as to guide the user to a destination by dialog with the user. Such a guiding system, which can be implemented using a generally used cellular phone, requires no specific device and is thus inexpensive. This guiding system also provides a high level of safety since the guidance is performed through voice and does not require the user to confirm map information on a display screen.

However, such a conventional navigation system requires the user to communication with a base station in the form of dialog until the user arrives at the destination, and is not practical in terms of telephone charges to the user of the cellular phone. This system also requires the user to inform the base station of the current location of the user. This also prevents the user, who is driving the automobile, from concentrating on driving and thus is quite dangerous.

SUMMARY OF THE INVENTION

According to an aspect of the invention, a navigation apparatus for guiding a moving body from a current location to a destination using a communication base station includes a current location detection device for detecting a current location of the moving body and outputting current location information representing the current location; a sending device for sending the current location information and destination information representing a destination of the moving body to the communication base station via a communication line; a receiving device for receiving guiding information, which is required to guide the moving body from the current location to the destination and includes information representing a location of a guiding point and a navigation message corresponding to the guiding point, from the communication base station via the communication line; a memory device for storing the guiding information received by the receiving device; and a voice processing device for outputting the navigation message corresponding to the guiding point in voice format, based on the current location information output by the current location detection device and the information representing the location of the guiding point which is included in the guiding information stored in the memory device.

In one embodiment of the invention, the voice output from the voice processing device is one of a voice synthesized by a voice synthesis device and a voice of a specific individual user which is stored in the memory device in advance.

In one embodiment of the invention, the navigation apparatus is one of a cellular phone and a mobile information terminal.

In one embodiment of the invention, the information representing the location of the guiding point includes information representing a latitude and a longitude of the guiding point.

In one embodiment of the invention, the navigation message is one of text information and compressed voice information.

In one embodiment of the invention, the memory device further stores history information representing a history of a destination designated in the past.

In one embodiment of the invention, the memory device is a rewritable nonvolatile memory.

In one embodiment of the invention, the voice processing device compares the current location information and the information representing the location of the guiding point included in the guiding information so as to determine whether the moving body has passed the guiding point or not; when the moving body is determined to have passed the guiding point, the voice processing device determines an operation mode of the navigation apparatus; and when the operation mode is determined to be a mode other than the guiding mode, the voice processing device notifies a user of the navigation apparatus to switch the operation mode to the guiding mode in the voice format.

According to another aspect of the invention, a communication base station includes a map information database storing map information; a receiving device for receiving current location information representing a current location of a moving body and destination information from a navigation apparatus via a communication line; a search device for searching through the map information database based on the current location information and the destination information received by the receiving device, so as to acquire guiding information, which is required to guide the moving body from the current location to the destination and includes information representing a location of a guiding point and a navigation message corresponding to the guiding point; and a sending device for sending the guiding information to the navigation apparatus via the communication line.

In one embodiment of the invention, the communication base station further includes a category database storing information classified by category. The search device searches the category database, so as to acquire information representing at least one candidate for the destination and calculate a distance or a time to each candidate of the at least one candidate from the current location. The sending device sends the information representing the at least one candidate and information representing the distance or the time to the navigation apparatus via the communication line.

According to still another aspect of the invention, a navigation system for guiding a moving body from a current location to a destination is provided. The navigation system includes a navigation apparatus and a communication base station. The navigation apparatus includes a current location detection device for detecting a current location of the moving body and outputting current location information representing the current location; a first sending device for sending the current location information and destination information representing a destination of the moving body via a communication line to the communication base station; a first receiving device for receiving guiding information, which is required to guide the moving body from the current location to the destination and includes information representing a location of a guiding point and a navigation message corresponding to the guiding point, from the communication base station via the communication line; a memory device for storing the guiding information received by the first receiving device; and a voice processing device for outputting the navigation message corresponding to the guiding point in voice format, based on the current location information output by the current location detection device and the information representing the location of the guiding point which is included in the guiding information stored in the memory device. The communication base station includes a map information database storing map information; a second receiving device for receiving the current location information and the destination information from the navigation apparatus via the communication line; a search device for searching through the map information database based on the current location information and the destination information received by the second receiving device, so as to acquire the guiding information; and a second sending device for sending the guiding information to the navigation apparatus via the communication line.

According to still another aspect of the invention, a navigation method for guiding a moving body from a current location to a destination, using a navigation system including a navigation apparatus and a communication base station is provided. The navigation apparatus includes a current location detection device for detecting a current location of the moving body and outputting current location information representing the current location, and a memory device. The communication base station includes a map information database storing map information. The navigation method includes the steps of the navigation apparatus sending the current location information and destination information representing a destination of the moving body via a communication line to the communication base station; the communication base station searching through the map information database based on the current location information and the destination information, so as to acquire guiding information, which is required to guide the moving body from the current location to the destination and includes information representing a location of a guiding point and a navigation message corresponding to the guiding point; the communication base station sending the guiding information to the navigation apparatus via the communication line; the navigation apparatus storing the guiding information sent from the communication base station in the memory device; and the navigation apparatus outputting the navigation message corresponding to the guiding point in voice format, based on the current location information output by the current location detection device and the information representing the location of the guiding point which is included in the guiding information stored in the memory device.

In one embodiment of the invention, the communication base station further includes a category database storing information classified by category. The navigation method includes the steps of the communication base station searching the category database, so as to acquire information representing at least one candidate for the destination and calculate a distance or a time to each candidate of the at least one candidate from the current location; and the communication base station sending the information representing the at least one candidate and information representing the distance or the time to the navigation apparatus via the communication line.

According to still another aspect of the invention, the memory device further stores history information representing a history of a destination designated in the past. The communication base station refers to the history information stored in the memory device, and searches the category database in consideration of contents of the history information.

In one embodiment of the invention, the navigation method further includes the steps of the navigation apparatus comparing the current location information and the information representing the location of the guiding point included in the guiding information so as to determine whether or not the moving body has passed the guiding point; when the moving body is determined to have passed the guiding point, the navigation apparatus determining an operation mode of the navigation apparatus; and when the operation mode is determined to be a mode other than the guiding mode, the navigation apparatus notifying a user of the navigation apparatus to switch the operation mode to the guiding mode in the voice format.

Thus, the invention described herein makes possible the advantages of providing a navigation apparatus, a communication base station, a navigation system and a navigation method for guiding a user at a specific point so as to allow a user to reach a destination at a lower cost while guaranteeing safety.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
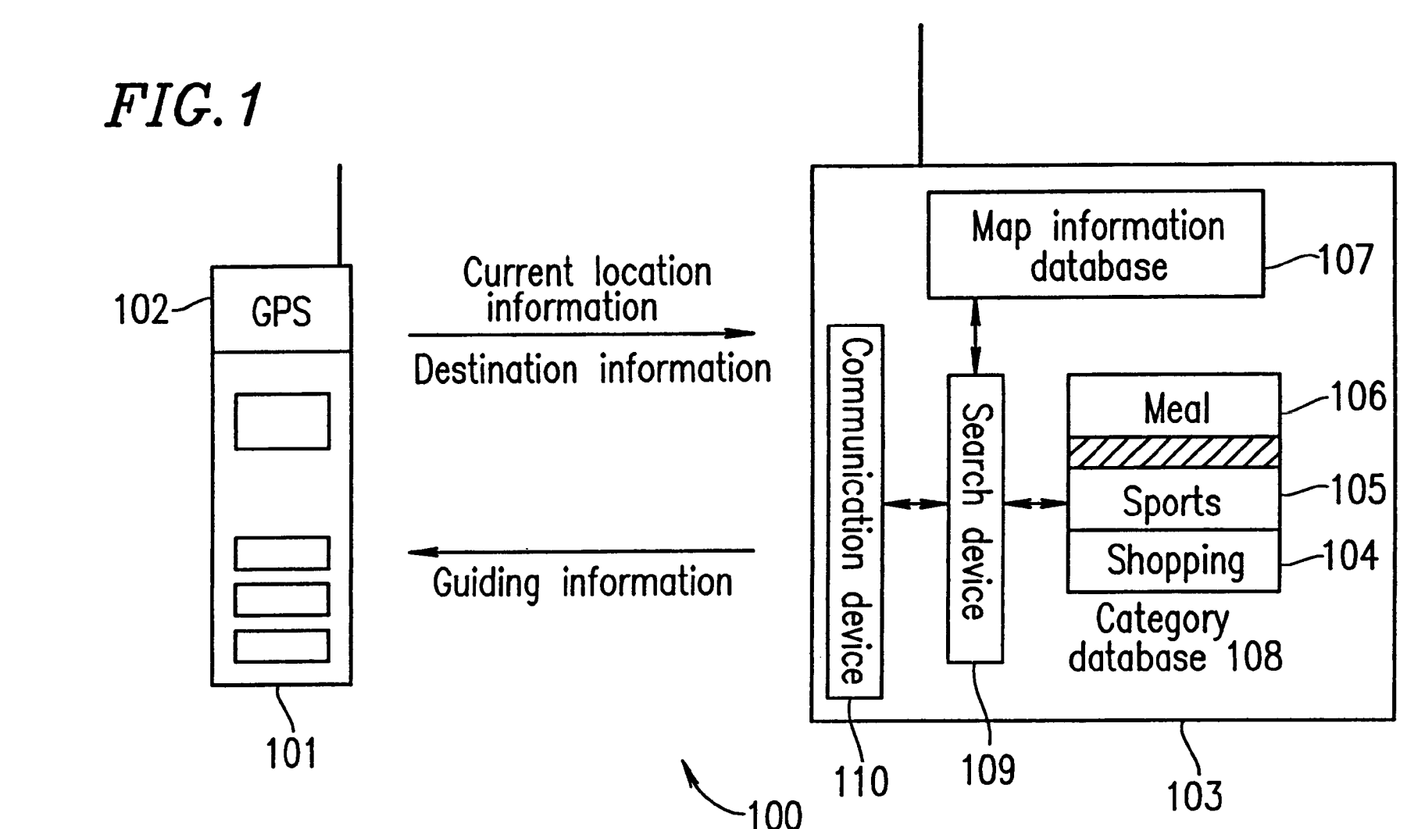
FIG. 1 shows an example of a structure of a navigation system 100 according to a first example of the present invention.

FIG. 1 shows an example of a structure of a navigation system 100 according to a first example of the present invention. The navigation system 100 includes a navigation apparatus 101 and a communication base station 103. The navigation apparatus 101 and the communication base station 103 are constructed so as to mutually send and receive information through a communication line. The communication line may be wireless or wired, or any combination thereof.

The navigation apparatus 101 has a function of guiding a moving body from a current location to a destination using the communication base station 103. The navigation apparatus 101 may be, for example, a cellular phone or a mobile information terminal. The moving body is any movable body, for example, an automobile or an individual.

The navigation apparatus 101 include a GPS (Global Positioning System) terminal 102 as a current location detection device for detecting a current location of the moving body. The GPS terminal 102 outputs current location information which represents the current location of the moving body (for example, information representing a latitude or a longitude of the current location).

The navigation apparatus 101 sends the current location information output from the GPS terminal 102 and destination information representing a destination of the moving body to the communication base station 103. The destination information is represented by, for example, an address, a registered telephone number or a name of a building.

The communication base station 103 includes a map information database 107 storing map information, a search device 109 for searching through the map information database 107, and a communication device 110.

The communication device 110 in part acts as a receiving device for receiving the current location information and the destination information from the navigation apparatus 101.

The search device 109 searches through the map information database 107 based on the current location information and the destination information received by the communication device 110 so as to specify at least one guiding point required to guide the moving body from the current location to the destination and acquire guiding information regarding the at least one guiding point.

The communication device 110 also acts in part as a sending device for sending the guiding information acquired by the search device 109 to the navigation apparatus 101.

The guiding information includes information representing a location of the guiding point (for example, information representing a latitude and a longitude of the guiding point) and a navigation message corresponding to the guiding point. The navigation message is a sentence which is to be given to the user by the navigation apparatus 101 when the moving body passes the guiding point.

Hereinafter, a specific example of navigation using the navigation system 100 will be described with reference to FIG. 2. It is assumed that the moving body is an automobile, the navigation apparatus 101 is a cellular phone, and the user of the cellular phone is driving the automobile.

Figure 2:
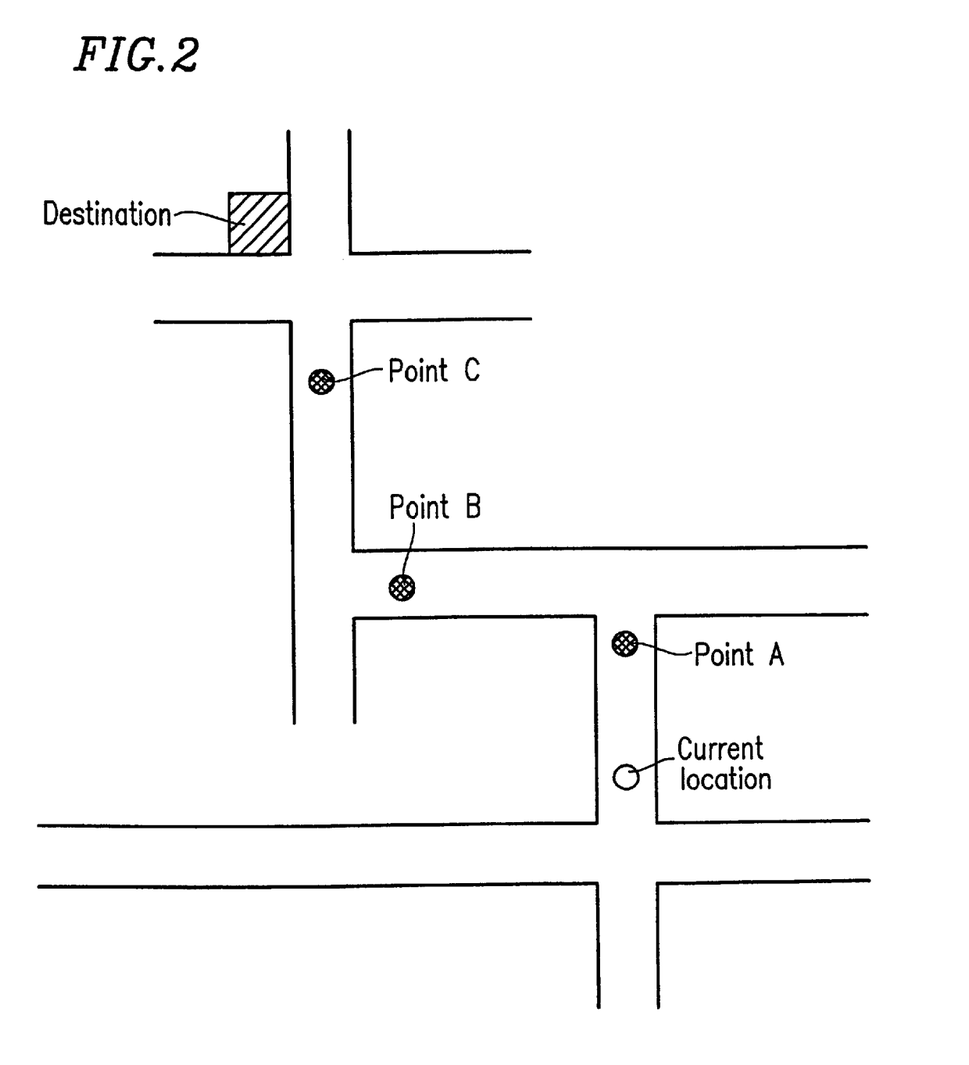
FIG. 2 shows a specific example of navigation using the navigation system 100.

In FIG. 2, the "current location" is the current location to which the moving body is moving to, and the "destination" is the destination of the moving body. In the example shown in FIG. 2, three points A, B and C are set as guiding points required to guide the moving body from the current location to the destination. The locations and the number of the guiding points may be appropriately set in accordance with a route from the current location to the destination by the communication base station 103.

Figure 3:
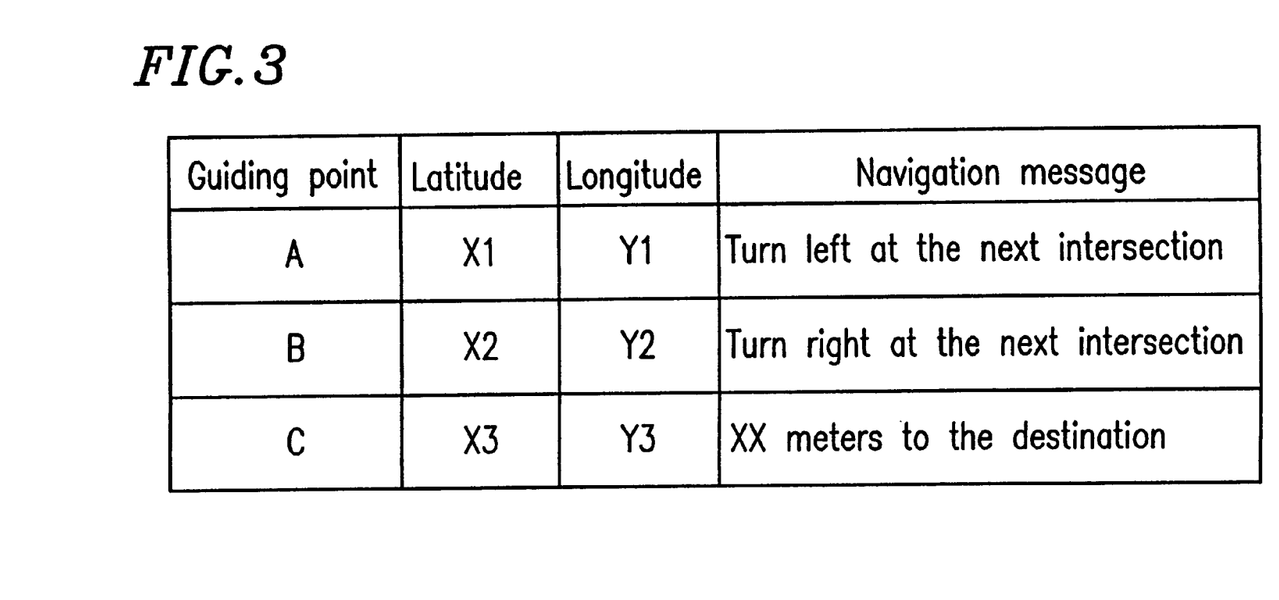
FIG. 3 shows an example of guiding information.

FIG. 3 shows an example of the guiding information regarding the three guiding points A, B and C shown in FIG. 2. The guiding information includes information representing a latitude and a longitude of each of the guiding points, and a navigation message corresponding to each of the guiding points. FIG. 3 shows that the latitude of guiding point A is X1, longitude of guiding point A is Y1, and the navigation message to be given to the user of the cellular phone when the moving body passes guiding point A is "turn left at the next intersection".

The communication base station 103 acquires the guiding information as shown in FIG. 3 based on a search result from the map information database 107, and sends the guiding information to the navigation apparatus 101. As described above, the navigation apparatus 101 includes the GPS terminal 102 which consistently monitors the current location of the moving body. The navigation apparatus 101 compares the latitude and the longitude of the current location output by the GPS terminal 102, with latitude X1 and longitude Y1 of guiding point A included in the guiding information sent from the communication base station 103, so as to determine whether or not the moving body has passed guiding point A (latitude X1; longitude Y1) or not. When the latitude and the longitude of the current location output by the GPS terminal 102 match latitude X1 and longitude Y1 of guiding point A included in the guiding information sent from the communication base station 103, it is determined that the moving body has passed guiding point A. In this case, the navigation apparatus 101 outputs the navigation message corresponding to guiding point A, i.e., "turn left at the next intersection" in voice format.

As described above, in the example shown in FIG. 3, when the moving body has passed guiding point A, the message "turn left at the next intersection" is given to the user by the navigation apparatus 101. Thus, the driver of the automobile appreciates the direction to take next when the automobile has just passed guiding point A. When the automobile has passed guiding point B or C, the driver of the automobile can appreciate the direction to take next in a similar manner. In this manner the driver of the automobile follows the voice navigation provided by the navigation apparatus 101 to cause the user to arrive at the destination.

The voice output by the navigation apparatus 101 may be a voice synthesized by a known voice synthesis device (synthesized voice) or a voice of a specific individual registered in advance (natural voice). The natural voice of a registered individual can be stored on, for example, a rewritable nonvolatile memory described below.

A guiding point is the point which is determined by the communication base station 103 as necessary to guide the moving body from the current location to the destination. Accordingly, the driver of the automobile need not be aware of how many guiding points are provided before arriving at the destination, but only needs to follow the navigation message to move toward the destination.

In the navigation system 100 according to the present invention, the navigation apparatus 101 downloads only the guiding information from the communication base station 103. The guiding information needs to include only the information representing the location of the guiding point and a navigation message corresponding to the guiding point, and therefore only needs a very small data amount. Due to such a small data amount, the guiding information can be entirely downloaded to the navigation apparatus 101.

The navigation apparatus 101 only needs to be connected through the communication line (for example, a telephone line) with the communication base station 103 only while downloading the guiding information. Once the guiding information is downloaded to the navigation apparatus 101, the navigation apparatus 101 can navigate the user without relying on the communication base station 103, and thus need not be connected with the communication base station 103. Therefore, the navigation service is provided at a lower communication cost (for example, lower cellular telephone charges).

The guiding information does not provide the user any information on anything between the current point and the destination, but is sufficient to fulfill the purpose of guiding the moving body to the destination.

In this example, car navigation using a voice is described, but the present invention is not limited to this. Further, the moving body is not limited to an automobile.

Figure 4:
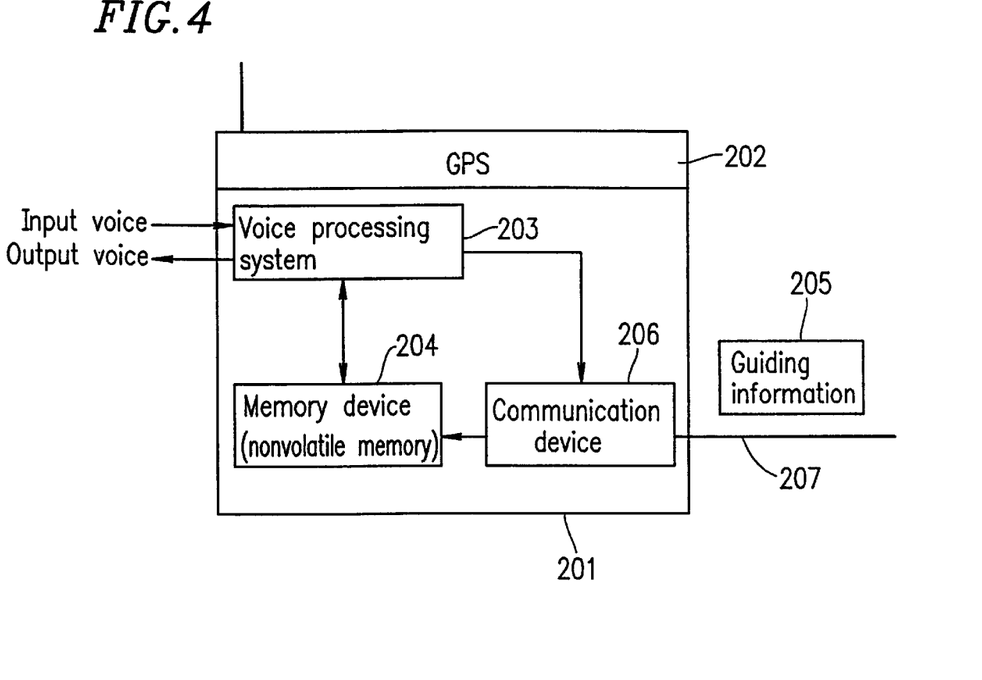
FIG. 4 shows an example of a structure of a cellular phone 201.

FIG. 4 shows an exemplary structure of a cellular phone 201 as an example of the navigation apparatus 101.

The cellular phone 201 includes a GPS terminal 202, a voice processing device 203, a memory device 204 and a communication device 206.

The communication device 206 acts as a sending device for sending current location information and the destination information via a communication line 207 to the communication base station 103 (FIG. 1), and also acts as a receiving device for receiving guiding information 205 from the communication base station 103 via the communication line 207. The communication line 207 may be wireless or wired, or any combination thereof.

The guiding information 205 received by the communication device 206 is stored in the memory device 204. The memory device 204 is, for example, a rewritable nonvolatile memory.

The guiding information 205 includes information representing the location of a guiding point (for example, a latitude and a longitude) and a navigation message corresponding to the guiding point.

The voice processing device 203 outputs a navigation message, in voice format, corresponding to the guiding point based on the current location information output by the GPS terminal 202 and the information representing the location of the guiding point stored in the memory device 204.

In the case where the voice processing device 203 has a voice synthesis function of synthesizing voice based on text information, the navigation message can be test information. In the case where the voice processing device 203 has a voice de-compression function of de-compressing compressed voice information, the navigation message can be compressed voice information (for example, information obtained by compressing pre-recorded voice). In either case, the navigation message is converted into a voice by the voice processing device 203. The voice is output from the cellular phone 201.

In the case where the voice processing device 203 has a voice recognition function, the destination information to be sent to the communication base station 103 may be input to the cellular phone 201 in voice format.

The present applicant has proposed a nonvolatile memory which is optimum for a voice processing system of a mobile device for generating a synthetic sound in Japanese Application No. 2000-361980. The nonvolatile memory disclosed in Japanese Application No. 2000-361980 is preferably used as the memory device 204. The nonvolatile memory includes a volatile or nonvolatile memory area which is accessible at a high speed, such as an SRAM or the like. The nonvolatile memory disclosed in the above-mentioned publication realizes real-time voice processing by adopting a bus structure connected to a DSP (digital signal processor) for performing voice processing via a dedicated bus. Use of this nonvolatile memory allows the data to be written therein from an external device at a high speed while performing voice processing, although data is usually written to a nonvolatile memory at a low speed. This nonvolatile memory is described also in detail in Japanese Application No. 2000-176182. Herein, Japanese Application No. 2000-361980 and Japanese Application No. 2000-176182 are entirely incorporated for reference.

EXAMPLE 2

In a second example of the present invention, an example of supporting a process for allowing a user of a cellular phone to determine a destination by a communication base station proposing candidate destinations to the user of the cellular phone will be described.

The communication base station 103 (FIG. 1) includes a map information database 107 storing map information required for voice navigation and a category database 108 storing data classified by category.

The category database 108 includes database files of a plurality of categories. In the example shown in FIG. 1, the category database 108 includes a shopping database file 104, a sports database file 105 and a meal database file 106. In the example shown in FIG. 1, the map information database file 107 and the category database 108 are searched through by the same search device 109. The map information database file 107 and the category database 108 may be searched through by different search devices.

Figure 5:
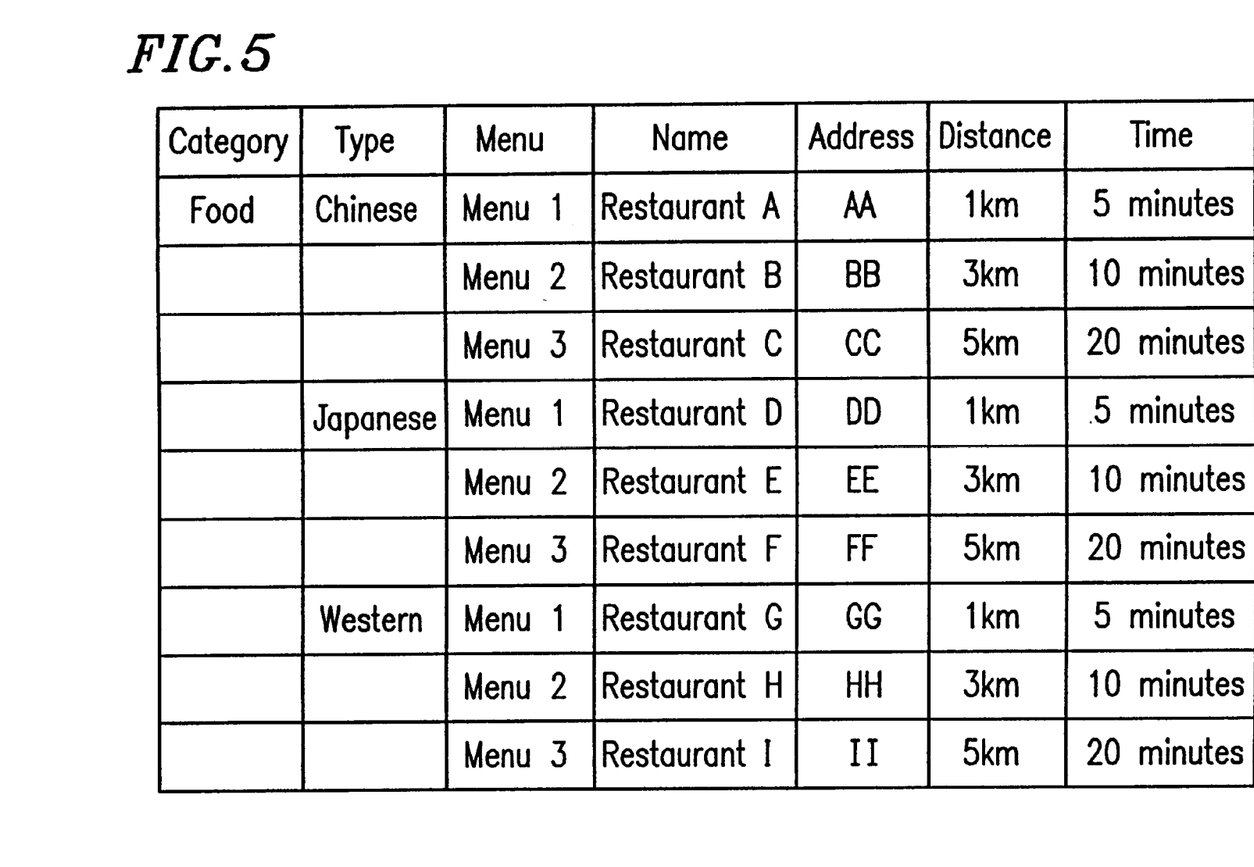
FIG. 5 shows an example of a meal database file 106.

FIG. 5 shows an example of the meal database file 106. In the example shown in FIG. 5, the category of "meal" is classified into three types of Chinese, Japanese and Western meal types. Three restaurants for each type, i.e., a total of nine restaurants, are registered. For each restaurant, "type", "menu", "name", "address", "distance" and "time" are registered. "Distance" means the distance between the current location and the restaurant. "Time" means the time required to reach the restaurant when the user of the cellular phone 201 (FIG. 4) moves from the current location to the restaurant at a normal speed (estimated time).

"Distance" and "time" are calculated based on the current location information output by the GPS terminal 202 and the information representing the location of the restaurant registered in the communication base station 103 (for example, information representing the latitude and the longitude of the restaurant). "Distance" and "time" are updated at a predetermined timing. Such calculation and update are performed by, for example, the search device 109.

The user of the cellular phone 201 sometimes has a definite purpose of having a meal but has not decided what to eat, or sometimes definitely knows what to eat but does not have knowledge of suitable restaurants or locations thereof. In such a case, a navigation system for allowing the user to decide a destination through dialog based on the proposals provided by the communication base station 103 is convenient.

Hereinafter, an example of dialog-type navigation will be described with reference to FIG. 5. In the following description, "U" indicates a message provided by the user of the cellular phone 201, and "T" indicates a message provided by the cellular phone 201 based on the proposals from the communication base station 103.

U: "Meal"→T: "How about Chinese?"→U: "Any suggestion on the restaurant?"→T: "Restaurant A is 1 km away from here."→U: "I do not like that restaurant." (negative)"→T: "How about restaurant B which is 3 km away from there?"→U: "Take me there."→T: "I will take you there. You will arrive in about 10 minutes."→Navigation starts.

As described above, when the user of the cellular phone 201 says the word "meal", the communication base station 103 proposes to the user of the cellular phone 201 candidate destinations in accordance with the contents of the meal database file 106. Since the candidate destinations are provided in the form of a proposal, the user of the cellular phone 201 can determine the destination easily. Since the proposal is made by the communication base station 103 in the dialog form, human-like conversation can be performed, thus providing ease of use for the user.

The proposal by the communication base station 103 can be made by inserting the information such as "type", "name" and "distance", registered in the meal database file 106, into a template. The response from the user of the cellular phone 201 can be realized by comparing the voice input to the cellular phone 201 and a predetermined template stored in the memory device 204 in advance. The predetermined template may be text-type information input as characters or voice-type information (for example, natural voice of the user of the cellular phone 201).

What words are said by an individual when agreeing or disagreeing with another party greatly depends on each individual. Therefore, it is preferable to register "Yes", "That's right", and "I got it", for example, all as affirmative terms in advance. In this manner, conversations can be made with a higher degree of freedom. By mounting the memory device 204 (for example, a nonvolatile memory) on the cellular phone 201, the navigation system can be customized (personalized). Conversations for retrieving the information regarding the destination are diversified, and the destination may be selected based on the time or distance, for example.

EXAMPLE 3

In a third example of the present invention, an example of supporting a process for allowing a user of a cellular phone to determine a destination by a communication base station proposing candidate destinations to the user in consideration of history information will be described. The history information shows a history of destinations designated by the user in the past and is stored in advance in a memory device of the cellular phone.

Figure 6:
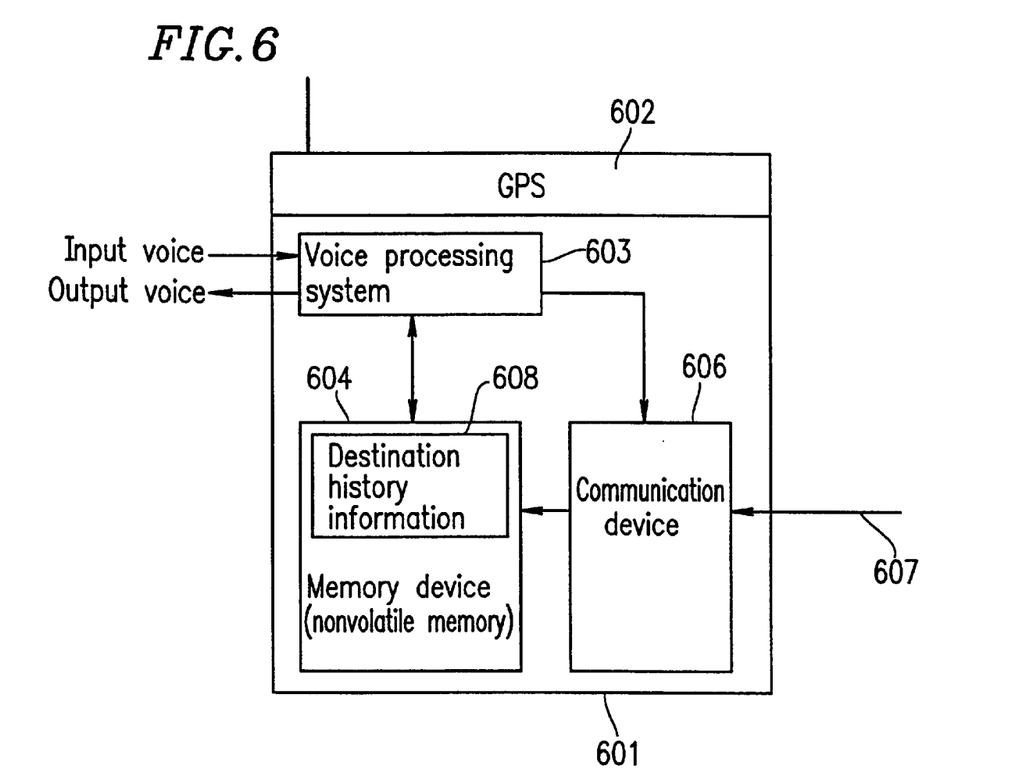
FIG. 6 shows an example of a structure of another cellular phone 601.

FIG. 6 shows an exemplary structure of a cellular phone 601 as an example of the navigation apparatus 101.

The cellular phone 601 includes a GPS terminal 602, a voice processing device 603, a memory device 604 and a communication device 606. The memory device 604 stores destination history information 608 representing a history of destinations designated by a user of the cellular phone 601 in the past. The memory device 604 is, for example, a nonvolatile memory.

Before proposing candidate destinations to the user of the cellular phone 601, the communication base station 103 refers to the destination history information 608 stored in the memory device 604 and searches for the category database 108 in consideration of the contents of the destination information 608. Thus, the communication base station 103 proposes candidate destinations to the user of the cellular phone 601 in consideration of the contents of the destination information 608. For example, the destinations in the destination information 608 are proposed with a higher priority.

Thus, proposals can be made suitable to the activity pattern of the user of the cellular phone 601.

The information stored in the memory device 604 is not limited to the destination information. Any information which can be used as a reference in determining the destination may be stored. For example, information representing the interests and eating preferences of the user of the cellular phone 601 may be stored.

EXAMPLE 4

In a fourth example of the present invention, an operation performed in the case where the operation mode of the navigation apparatus is in a mode other than a guiding mode when the moving body passes the guiding point will be described. In this example, the navigation apparatus is a cellular phone, the moving body is a user of the cellular phone, and the mode other than a guiding mode is a conversation mode (i.e., a telephone call is being made).

Figure 7:
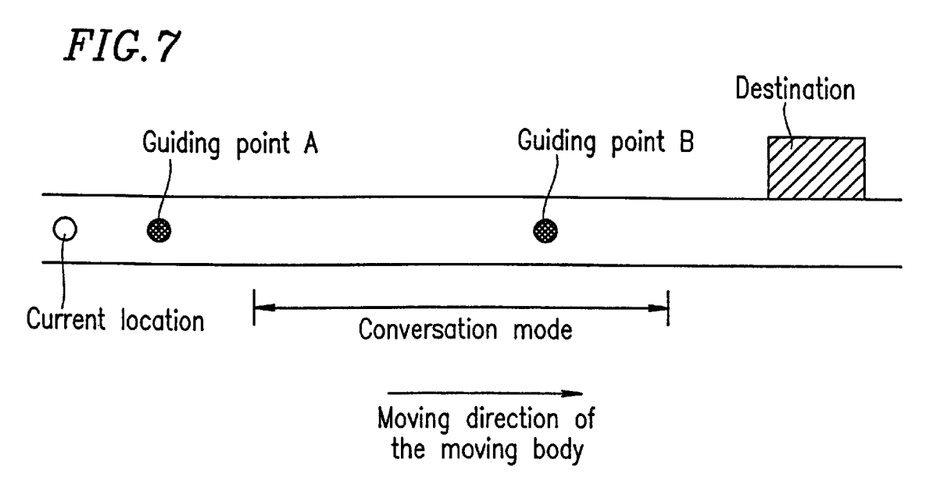
FIG. 7 shows an example of the relationship of guiding points A and B with a time period in which the operation mode of the cellular phone 201 of FIG. 4 is a conversation mode.

FIG. 7 shows an example of the relationship of guiding points A and B with a time period in which the operation mode of the cellular phone 201 (FIG. 4) is the conversation mode. In the example shown in FIG. 7, it is assumed that when the user of the cellular phone 201 passed guiding point A, the operation mode of the cellular phone 201 was not the conversation mode, but when the user of the cellular phone 201 passes guiding point B, the operation mode of the cellular phone 201 is the conversation mode.

When the user of the cellular phone 201 has passed guiding point A, the navigation message corresponding to guiding point A is output in voice format as described in the first example. When the user of the cellular phone 201 has passed guiding point B, a message for notifying the user to switch the mode of the cellular phone 201 from the conversation mode to the guiding mode is output in voice format. This is performed to prevent the user of the cellular phone 201 from missing the guiding message corresponding to guiding point B. Instead of the notifying message, a sound audible to the user may be output.

Figure 8:
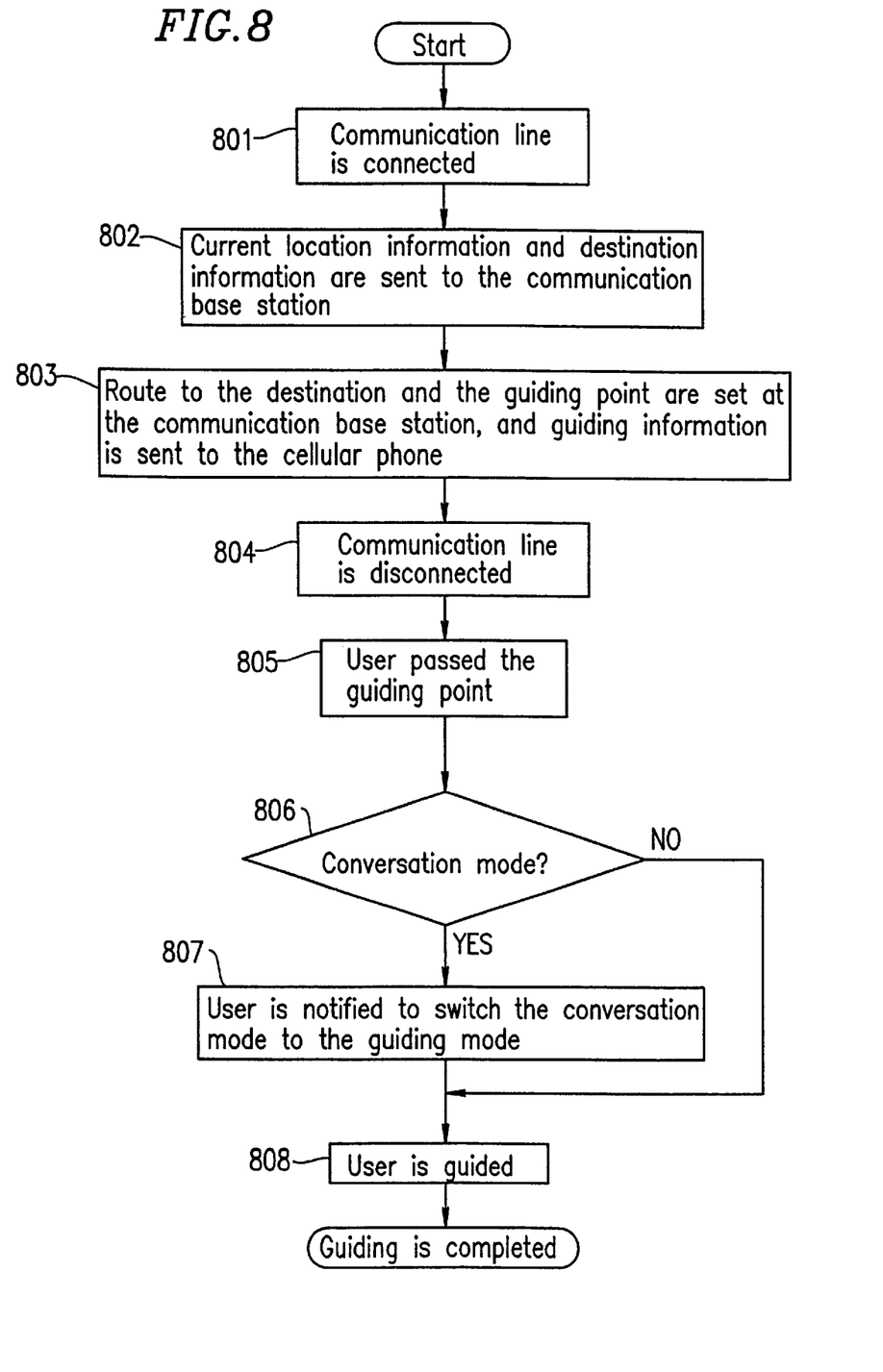
FIG. 8 is a flowchart illustrating a process of navigation using the cellular phone 201 of FIG. 4.

FIG. 8 shows a process of navigation provided by the cellular phone 201.

Steps 801 through 804 are the same as described above in the previous examples. More specifically, the cellular phone 201 is connected to the communication base station 103 (FIG. 1) via a communication line (for example, a telephone line) (step 801). The current location information and the destination information are sent from the cellular phone 201 to the communication base station 103 (step 802), and the guiding information is sent from the communication base station 103 to the cellular phone 201 (step 803). Then, the cellular phone 201 is disconnected from the communication base station 103 (step 804).

In step 805, it is detected that the user of the cellular phone 201 has passed a guiding point. In step 806, it is determined whether the operation mode of the cellular phone 201 is the conversation mode or not. For example, the cellular phone 201 is determined to be in the "conversation mode" from the time when a conversation button is pushed to place the cellular phone 201 into an off-hook state until the conversation button is pushed again to place the cellular phone 201 back into an on-hook state. Such a determination of the state of the cellular phone 201 can be performed by the voice processing device 203 (FIG. 4).

When the operation mode of the cellular phone 201 is determines as the conversation mode in step 806, a message notifying the user to switch the operation mode from the conversation mode to the guiding mode is provided in voice format in step 807, so that navigation can be performed at the guiding point. Such a voice output can be performed by, for example, the voice processing device 203. The user of the cellular phone 201 can switch the operation mode of the cellular phone 201 from the conversation mode to the guiding mode without once disconnecting the cellular phone 201 from the communication line for the conversation of the conversation mode (step 808). When the voice output of the guiding message is completed, the operation mode of the cellular phone 201 can be switched back to the conversation mode immediately.

According to such a structure, the user can use the cellular phone 201 with no need to specifically pay attention to a guiding point.

In the first through fourth examples, a cellular phone is described as an example of a navigation apparatus of the present invention. The navigation apparatus is not limited to this. The navigation apparatus may be any movable device having a communication function, such as, for example, a mobile information terminal.

A navigation apparatus according to the present invention guides the user from a current location to a destination through voice using a cellular phone, a mobile information terminal or the like while guaranteeing the safety of the user. By adding location information to the voice information required for guiding, the navigation apparatus can guide the user to the destination by only guiding the user at a specific point(s). Since only the guiding information is downloaded from the communication base station to the navigation apparatus and the data amount required for the guiding information is very small, the entire guiding information can be downloaded to the navigation apparatus. Since the navigation apparatus needs to be connected to the communication base station only during download is performed and can be disconnected when the downloading is finished, the navigation service can be provided at low cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A navigation apparatus for guiding a moving body from a current location to a destination using a communication base station, comprising:

a current location detection device for detecting a current location of the moving body and outputting current location information representing the current location;

a sending device for sending the current location information and destination information representing a destination of the moving body to the communication base station via a communication line;

a receiving device for receiving guiding information, which is required to guide the moving body from the current location to the destination and includes information representing a location of a guiding point and a navigation message corresponding to the guiding point, from the communication base station via the communication line;

a memory device for storing the guiding information received by the receiving device; and a voice processing device for outputting the navigation message corresponding to the guiding point in voice format, based on the current location information output by the current location detection device and the information representing the location of the guiding point which is included in the guiding information stored in the memory device.

2. A navigation apparatus according to claim 1, wherein the voice output from the voice processing device is one of a voice synthesized by a voice synthesis device and a voice of a specific individual user which is stored in the memory device in advance.

3. A navigation apparatus according to claim 1, wherein the navigation apparatus is one of a cellular phone and a mobile information terminal.

4. A navigation apparatus according to claim 1, wherein the information representing the location of the guiding point includes information representing a latitude and a longitude of the guiding point.

5. A navigation apparatus according to claim 1, wherein the navigation message is one of text information and compressed voice information.

6. A navigation apparatus according to claim 1, wherein the memory device further stores history information representing a history of a destination designated in the past.

7. A navigation apparatus according to claim 1, wherein the memory device is a rewritable nonvolatile memory.

8. A navigation apparatus according to claim 1, wherein the voice processing device compares the current location information and the information representing the location of the guiding point included in the guiding information so as to determine whether the moving body has passed the guiding point or not; when the moving body is determined to have passed the guiding point, the voice processing device determines an operation mode of the navigation apparatus; and when the operation mode is determined to be a mode other than the guiding mode, the voice processing device notifies a user of the navigation apparatus to switch the operation mode to the guiding mode in the voice format.

9. A communication base station, comprising:

a map information database storing map information;

a receiving device for receiving current location information representing a current location of a moving body and destination information from a navigation apparatus via a communication line;

a search device for searching th rough the map information database based on the current location information and the destination information received by the receiving device, so as to acquire guiding information, which is required to guide the moving body from the current location to the destination and includes information representing a location of a guiding point and a navigation message corresponding to the guiding point; and a sending device for sending the guiding information to the navigation apparatus via the communication line.

10. A communication base station according to claim 9, further comprising a category database storing information classified by category, wherein:

the search device searches the category database, so as to acquire information representing at least one candidate for the destination and calculate a distance or a time to each candidate of the at least one candidate from the current location; and the sending device sends the information representing the at least one candidate and information representing the distance or the time to the navigation apparatus via the communication line.

11. A navigation system for guiding a moving body from a current location to a destination, the navigation system including a navigation apparatus and a communication base station, wherein:

the navigation apparatus includes:
- a current location detection device for detecting a current location of the moving body and outputting current location information representing the current location;
- a first sending device for sending the current location information and destination information representing a destination of the moving body via a communication line to the communication base station;
- a first receiving device for receiving guiding information, which is required to guide the moving body from the current location to the destination and includes information representing a location of a guiding point and a navigation message corresponding to the guiding point, from the communication base station via the communication line;
- a memory device for storing the guiding information received by the first receiving device; and
- a voice processing device for outputting the navigation message corresponding to the guiding point in voice format, based on the current location information output by the current location detection device and the information representing the location of the guiding point which is included in the guiding information stored in the memory device; and the communication base station includes:
- a map information database storing map information;
- a second receiving device for receiving the current location information and the destination information from the navigation apparatus via the communication line;
- a search device for searching through the map information database based on the current location information and the destination information received by the second receiving device, so as to acquire the guiding information; and
- a second sending device for sending the guiding information to the navigation apparatus via the communication line.

12. A navigation method for guiding a moving body from a current location to a destination, using a navigation system including a navigation apparatus and a communication base station, the navigation apparatus including a current location detection device for detecting a current location of the moving body and outputting current location information representing the current location, and a memory device; and the communication base station including a map information database storing map information, the navigation method comprising the steps of:

the navigation apparatus sending the current location information and destination information representing a destination of the moving body via a communication line to the communication base station;

the communication base station searching through the map information database based on the current location information and the destination information, so as to acquire guiding information, which is required to guide the moving body from the current location to the destination and includes information representing a location of a guiding point and a navigation message corresponding to the guiding point;

the communication base station sending the guiding information to the navigation apparatus via the communication line;

the navigation apparatus storing the guiding information sent from the communication base station in the memory device; and the navigation apparatus outputting the navigation message corresponding to the guiding point in voice format, based on the current location information output by the current location detection device and the information representing the location of the guiding point which is included in the guiding information stored in the memory device.

13. A navigation method according to claim 12, wherein the communication base station further includes a category database storing information classified by category, the navigation method comprising the steps of:

the communication base station searching the category database, so as to acquire information representing at least one candidate for the destination and calculate a distance or a time to each candidate of the at least one candidate from the current location; and the communication base station sending the information representing the at least one candidate and information representing the distance or the time to the navigation apparatus via the communication line.

14. A navigation method according to claim 13, wherein:
the memory device further stores history information representing a history of a destination designated in the past, and the communication base station refers to the history information stored in the memory device, and searches the category database in consideration of contents of the history information.

15. A navigation method according to claim 12, further comprising the steps of:

the navigation apparatus comparing the current location information and the information representing the location of the guiding point included in the guiding information so as to determine whether or not the moving body has passed the guiding point;

when the moving body is determined to have passed the guiding point, the navigation apparatus determining an operation mode of the navigation apparatus; and when the operation mode is determined to be a mode other than the guiding mode, the navigation apparatus notifying a user of the navigation apparatus to switch the operation mode to the guiding mode in the voice format.

* * * * *